(12) United States Patent  
Spaulding et al.

(10) Patent No.: US 7,676,940 B2
(45) Date of Patent: Mar. 16, 2010

(54) LEVEL

(75) Inventors: James Spaulding, Bristol, CT (US);
Joseph Martone, Bristol, CT (US)

(73) Assignee: The Stanley Works, New Britain, CT (US)

( * ) Notice: Subject to any disclaimer, the term of this patent is extended or adjusted under 35 U.S.C. 154(b) by 58 days.

(21) Appl. No.: 12/144,849

(22) Filed: Jun. 24, 2008

(65) Prior Publication Data
US 2009/0313839 A1 Dec. 24, 2009

(51) Int. Cl.
*G01C 9/26* (2006.01)
(52) U.S. Cl. .......................... 33/373; 33/383
(58) Field of Classification Search ............... 33/370, 33/373, 374, 375, 381, 383, 495
See application file for complete search history.

(56) References Cited

U.S. PATENT DOCUMENTS

| 312,266 | A | | 2/1885 | Gurley |
|---|---|---|---|---|
| 1,767,335 | A | | 6/1930 | Wilcox |
| 1,845,801 | A | | 2/1932 | Kupferman |
| 2,752,692 | A | * | 7/1956 | Smith ........................ 33/374 |
| 2,807,888 | A | * | 10/1957 | Thomas ..................... 33/374 |
| 3,820,249 | A | * | 6/1974 | Stone ........................ 33/382 |
| 4,168,578 | A | | 9/1979 | Vanderwerf |
| 4,446,627 | A | | 5/1984 | Persson |
| D332,058 | S | | 12/1992 | Gruetzmacher |
| 5,167,075 | A | * | 12/1992 | Weldy et al. ................. 33/371 |
| 5,207,004 | A | | 5/1993 | Gruetzmacher |
| 5,255,443 | A | | 10/1993 | Schmidt |
| 5,839,200 | A | * | 11/1998 | Decesare .................... 33/381 |
| 6,029,359 | A | | 2/2000 | Szumer |
| 6,332,277 | B1 | * | 12/2001 | Owoc et al. .................. 33/373 |
| 2001/0034945 | A1 | * | 11/2001 | Smochek ..................... 33/373 |
| 2003/0066198 | A1 | * | 4/2003 | Turner ....................... 33/370 |
| 2008/0034599 | A1 | * | 2/2008 | Hamilton .................... 33/471 |
| 2009/0071023 | A1 | * | 3/2009 | Maruyama ................... 33/374 |

FOREIGN PATENT DOCUMENTS

| EP | 0961916 | 1/2000 |
|---|---|---|
| GB | 2218204 | 8/1989 |
| WO | 9836242 | 8/1998 |

* cited by examiner

*Primary Examiner*—G. Bradley Bennett
(74) *Attorney, Agent, or Firm*—Pillsbury Winthrop Shaw Pittman LLP

(57) ABSTRACT

A level includes a body having first and second arms attached to each other for relative pivotal movement about a pivot axis between open and closed positions. The level also includes a bubble vial mounted to the body and having a longitudinal axis coaxial with the pivot axis. Movement of the arms from their closed position to their open position exposes a measurement portion of the first bubble vial for use. Movement of the arms from their open position to their closed position shields the measurement portion of the first bubble vial within the body to protect the bubble vial from damage during storage.

22 Claims, 5 Drawing Sheets

LEVEL

BACKGROUND OF THE INVENTION

1. Field of the Invention

The present invention relates generally to levels such as those used to plumb and/or level signs, posts, pipes, or other structures.

2. Description of Related Art

Levels used to plumb and/or level signs, posts, pipes, etc. are known. See, e.g., U.S. Pat. No. 6,029,359. This type of level typically includes angularly offset arms that can be used to abut a cylindrical or polygonally-cross-sectioned surface of an object such as a sign, post, or other structure such that a longitudinal axis of the level is parallel to a longitudinal axis of the object. Such a level includes a plurality of bubble vials having predetermined orientations relative to the level's longitudinal axis (e.g., parallel, perpendicular) for plumbing and/or leveling the object.

Levels typically endure rough treatment during storage (e.g., being loosely stored in a tool box/bucket along with other sharp and/or heavy tools (e.g., hammers, screwdrivers, etc.). One or more of the bubble vials of conventional levels, such as that described in U.S. Pat. No. 6,029,359, hereby incorporated by reference in its entirety, are typically exposed during storage and are fragile. As a result, the bubble vials are sometimes accidentally broken during storage. There is therefore a need for a level that exposes its bubble vials for use, but protects its bubble vials during storage.

SUMMARY OF EMBODIMENTS OF THE INVENTION

One or more embodiments of the present invention provide a level that opens from a closed/storage position to an open/usable position. In the open/usable position, the level's bubble vials are exposed for viewing/use. When in the closed/storage position, the bubble vials are stored safely within the body of the level.

Another embodiment of the present invention provides a level that includes a body including first and second arms connected for relative pivotal movement about a pivot axis between open and closed positions. The body includes at least one reference surface. The level also includes a first bubble vial mounted to the body and having a longitudinal axis disposed parallel to or coaxial with the pivot axis. The first bubble vial is constructed and arranged to provide an indication of an orientation of the at least one reference surface. Movement of the arms from their closed position to their open position exposes a measurement portion of the first bubble vial for use. Movement of the arms from their open position to their closed position shields the measurement portion of the first bubble vial within the body.

According to one or more of these embodiments, the at least one reference surface includes first and second reference surfaces defined by the first and second arms, respectively, and the first and second reference surfaces are parallel to or include the pivot axis. According to one or more of these embodiments, when in the open position, the arms together define a third reference surface that is perpendicular to the pivot axis.

According to one or more of these embodiments, the level also includes a second bubble vial attached to the first arm. The second bubble vial has a longitudinal axis that is perpendicular to the pivot axis. Movement of the arms from their closed position to their open position exposes a measurement portion of the second bubble vial for use. Movement of the arms from their open position to their closed position shields the measurement portion of the second bubble vial within the body.

According to one or more of these embodiments, the level also includes a third bubble vial attached to the second arm, the third bubble vial having a longitudinal axis that is perpendicular to the pivot axis. Movement of the arms from their closed position to their open position exposes a measurement portion of the third bubble vial for use. Movement of the arms from their open position to their closed position shields the measurement portion of the third bubble vial within the body. The longitudinal axes of the second and third bubble vials are disposed at an angle relative to each other of between 60 and 120 degrees when the arms are in their open position.

According to one or more of these embodiments, the at least one reference surface comprises first and second reference surfaces defined by the first and second arms, respectively; the first and second reference surfaces are parallel to or include the pivot axis; the second bubble vial is attached to the second arm; and the longitudinal axis of the second bubble vial is parallel to or included within the second reference surface.

According to one or more of these embodiments, the first bubble vial is pivotally movable about the pivot axis relative to both arms.

According to one or more of these embodiments, movement of the arms from their open position to their closed position causes the first bubble vial to pivotally move about the pivot axis relative to both arms.

According to one or more of these embodiments, the arms have inner sides that face toward each other when the arms are in their closed position; and when the arms are in their open position, the measurement portion of the first bubble vial is exposed on a side of the level that includes the inner sides.

According to one or more of these embodiments, the arms form an angle relative to each other about the pivot axis when in their open position, and when the arms are in their open position, the measurement portion of the first bubble vial is exposed on a side of the arms in which the angle is larger than 180 degrees.

According to one or more of these embodiments, the body further comprises a pivot body that pivotally connects to each of the arms for pivotal movement relative to each of the arms about the pivot axis, and the first bubble vial is mounted to the pivot body for pivotal movement with the pivot body relative to each of the arms about the pivot axis.

According to one or more of these embodiments, the first bubble vial is disposed within the pivot body, and the pivot body includes a lateral opening through which the measurement portion of the bubble vial is viewable.

According to one or more of these embodiments, one of the arms comprises a cover portion that covers the lateral opening when the arms are in their closed position. The pivot body and first arm each may have pivot stops that limit and define a first pivotal range between the pivot body and the first arm, one end of the first pivotal range corresponding to an angle between the pivot body and the first arm when the arms are in their closed position, another end of the first pivotal range corresponding to an angle between the pivot body and the first arm when the arms are in their open position. The pivot body and second arm may each have pivot stops that limit and define a second pivotal range between the pivot body and the second arm, one end of the second pivotal range corresponding to an angle between the pivot body and the second arm when the arms are in their closed position, another end of the second pivotal range corresponding to an angle between the pivot body and the second arm when the arms are in their open position.

According to one or more of these embodiments, the second arm includes a recess, and the first arm includes a latch that aligns with the recess when the arms are in their closed position, the first arm being resiliently biased toward the recess to urge the arms to remain in their closed position when the arms are in their closed position.

According to one or more of these embodiments, the level also includes a flexible tether, a first end of which is attached to the second arm, a second end of which is constructed and shaped to releasably attach to the latch when the arms are in their open position.

Another embodiment of the present invention provides a level that includes a body including first and second arms connected for relative pivotal movement about a pivot axis between open and closed positions; and a first bubble vial mounted to the body and having a longitudinal axis parallel to or coaxial with the pivot axis. Movement of the arms from their open position to their closed position causes the first bubble vial to pivotally move about the pivot axis relative to both arms.

Another embodiment of the present invention provides a method of using a level, comprising moving first and second arms of a level relative to each other about a pivot axis from a closed position to an open position. Said moving exposes for use a measurement portion of a first bubble vial. The first bubble vial has a longitudinal axis that is parallel to or coaxial with the pivot axis.

According to one or more of these embodiments, the method also includes moving the arms from their open position to their closed position. Said moving of said arms from their open position to their closed position shields the measurement portion of the first bubble vial within a body of the level.

According to one or more of these embodiments, said moving comprises moving the arms relative to each other against a biasing force of a latch on the first arm that resiliently engages a recess in the second arm when the arms are in their closed position, and the method further comprises: positioning the level against an object, and attaching the level to the object by attaching an end of a tether to the latch, an opposite end of the tether being attached to the second arm.

Additional and/or alternative objects, features, aspects, and advantages of one or more embodiments of the present invention will become apparent from the following description, the accompanying drawings, and the appended claims.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Figure 9:
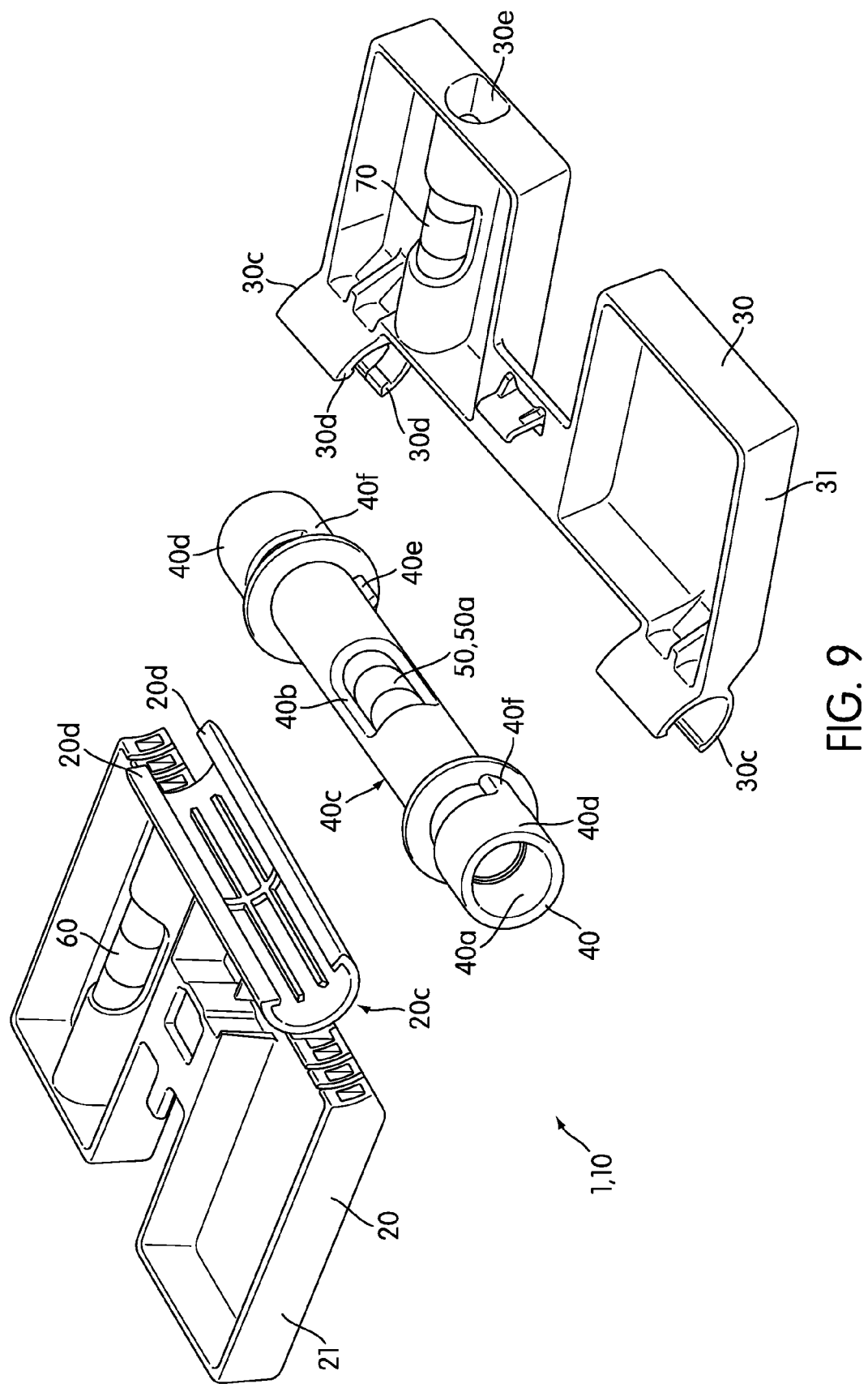
FIG. 9 is an exploded perspective view of the level of FIG. 1.

FIGS. 1-9 illustrate a level 1 according to an embodiment of the present invention. As best illustrated in FIG. 9, the level 1 includes a body 10 that includes a first arm 20, a second arm 30, and a pivot body 40, and three bubble vials 50, 60, 70.

The arms 20, 30 each connect to the pivot body 40 for pivotal movement relative to the pivot body 40 about a pivot axis 100. Consequentially, the arms 20, 30 are connected to each other (via the pivot body 40) for pivotal movement relative to each other about the pivot axis 100 between an open position (shown in FIGS. 1-3 and 6) and a closed position (shown in FIGS. 4, 5, and 7).

As best illustrated in FIG. 9, the bubble vial 50 (e.g., a bubble/spirit vial) is mounted within an axially extending hole 40a of the pivot body 40 such that a longitudinal axis of the bubble vial 50 is generally parallel to the pivot axis 100. As used herein, when a combination of two axes and/or surfaces are described as parallel, such parallel arrangement encompasses circumstances in which the axes/surfaces are spaced from each other or overlap each other (e.g., an axis that is coaxial with another axis or a surface/plane). The bubble vial 50 is fixed relative to the pivot body 40, and moves pivotally with the pivot body 40 relative to at least one of the arms 20, 30 about the pivot axis 100. In the illustrated embodiment, the hole 40a and longitudinal axis of the bubble vial 50 are both coaxial with the pivot axis 100. In another embodiment, however, the axis of the bubble vial 50 can be axially displaced from and parallel to the pivot axis 100.

The generally cylindrical (see FIG. 9) pivot body 40 includes a lateral opening 40b through which at least a measurement portion 50a of the bubble vial 50 is viewable. The remainder of the bubble vial 50 may be generally enclosed within and shielded by the pivot body 40. The measurement portion 50a of the bubble vial 50 includes a portion of the bubble vial 50 that permits a user to determine whether the bubble vial is horizontally positioned or not (e.g., indicia (such as lines) on the bubble vial 50 disposed on either side of a portion of the bubble vial 50 into which a bubble would be positioned if the longitudinal axis of the bubble vial 50 is horizontally positioned in a level orientation).

As shown in FIG. 9, the pivotal connections between the arms 20, 30 and the pivot body 40 comprise hinge portions 20c, 30c having arcuate, concave inside surfaces on the arms 20, 30, respectively, that engage convex, outside surface arcuate hinge portions 40c, 40d, respectively, of the pivot body 40. The inside surfaces of the hinge portions 20c, 30c may form part of a cylindrical surface that encompasses angles larger than 180 degrees such that they trap their respective, cylindrical-surfaced hinge portions 40c, 40d therein while permitting relative pivotal movement about the pivot axis 100. The hinge portions 20c, 30c may be resiliently flexible to enable them to snap over and engage the hinge portions 40c, 40d of the pivot body 40. Alternatively, the arms 20, 30 and pivot body 40 may pivotally connect to each other using any other suitable mechanism or hinge (e.g., living hinge, hinge, pin, etc.) without deviating from the scope of the present invention. Similarly, the pivot body 40 may be integrally formed with and/or rigidly attached to one of the arms 20, 30 without deviating from the scope of the present invention.

As shown in FIG. 9, the hinge portions 20c, 40c include pivot stops 20d, 40e, respectively, that limit and define a first pivotal range between the arm 20 and the pivot body 40 via their abutment at opposite extremes of the first pivotal range. One end of the first pivotal range corresponds to an angle between the pivot body 40 and arm 20 when the arms 20, 30 are in their closed position. An opposite end of the first pivotal range corresponds to an angle between the pivot body 40 and arm 20 when the arms 20, 30 are in their open position. Similarly, the hinge portions 30c, 40d include pivot stops 30d, 40f, respectively, that limit and define a second pivotal range between the arm 30 and the pivot body 40 via their abutment at opposite extremes of the pivotal range. One end of the second pivotal range corresponds to an angle between the pivot body 40 and arm 30 when the arms 20, 30 are in their closed position. An opposite end of the second pivotal range corresponds to an angle between the pivot body 40 and arm 30 when the arms 20, 30 are in their open position. Movement of the arms 20, 30 between their closed and open positions causes the pivot body 40 and bubble vial 50 to pivot relative to the arms 20, 30 (in opposite directions relative to each arm 20, 30) about the pivot axis 100. According to one embodiment of the invention, the first and second pivotal ranges are each approximately half of the total pivotal range of the arms 20, 30 relative to each other. According to another embodiment, the second pivotal range is about 100 degrees, the first pivotal range is about 170 degrees, and the total pivotal range of the arms 20, 30 relative to each other is about 270 degrees. In an embodiment where one of the arms is fixed to or integral with the pivot body 40, then all of the pivotal range of movement is between the pivot body and the other arm. The provision of the stops and limited range of movement is optional and can be dispensed with out deviating from the scope of the present invention.

As can be appreciated from FIGS. 1, 2, 4, and 5, the hinge portion 20d defines a cover portion that covers the lateral opening 40b when the arms 20, 30 are in their closed position, and does not cover the lateral opening when the arms 20, 30 are in their open position. Consequently, movement of the arms 20, 30 from their closed position to their open position exposes the measurement portion 50a of the bubble vial 50 for use, and movement of the arms 20, from their open position to their closed position shields the measurement portion 50a of the bubble vial 50 within the body 10.

As shown in FIGS. 1-7, the arms 20, 30 have outer sides 20a, 30a and inner sides 20b, 30b. The inner sides 20b, 30b face toward each other when the arms 20, 30 are in their closed position (see FIG. 7), and are disposed at an angle with respect to each other when the arms 20, 30 are in their open position (see FIG. 6). The outer sides 20a, 30a face in opposite directions from each other when the arms 20, 30 are in their closed position (see FIG. 7), and are disposed at an angle with respect to each other when the arms 20, 30 are in their open position (see FIG. 6).

Figure 2:
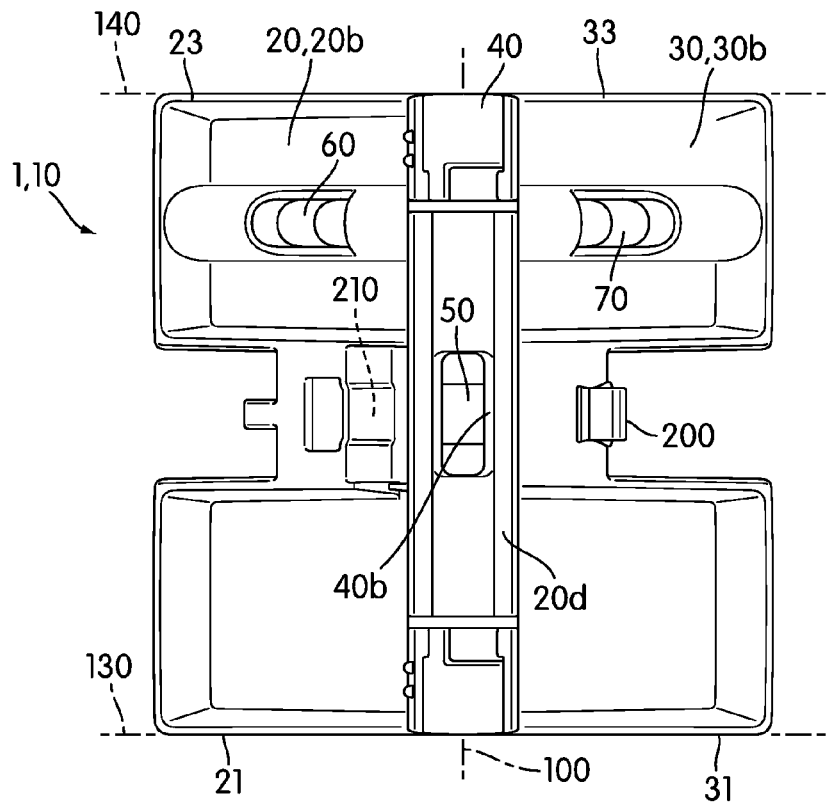
FIG. 2 is a front view of the level of FIG. 1 in an open position.
Figure 6:
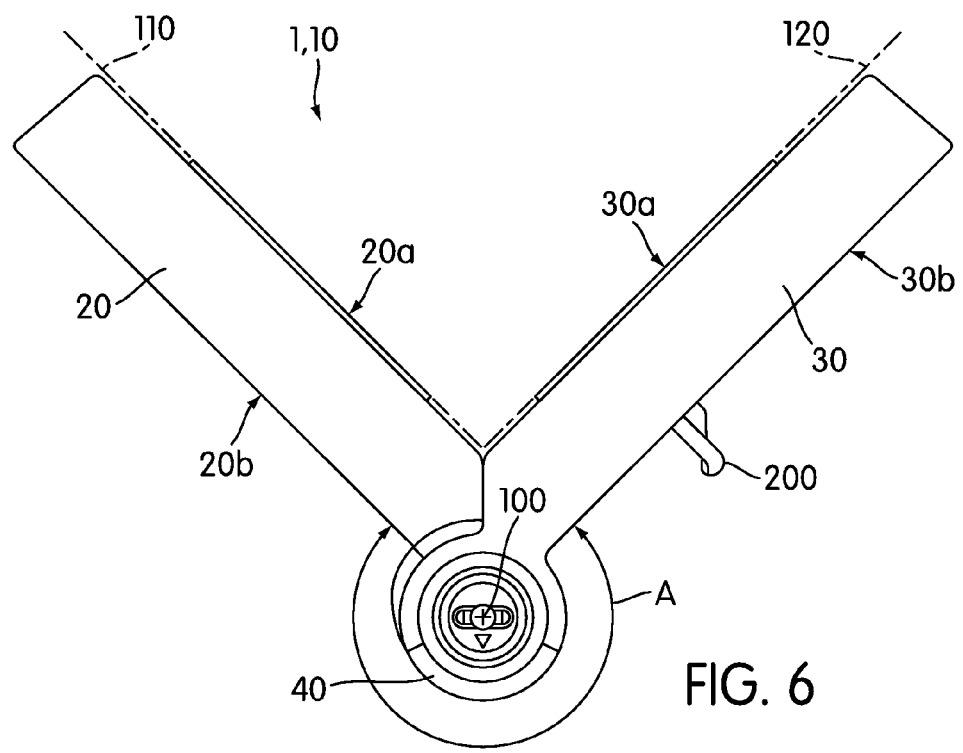
FIG. 6 is top view of the level of FIG. 1 in an open position.

As best illustrated in FIG. 6, outer sides 20a, 30a have reference surfaces that define reference surfaces 110, 120, respectively, that are parallel to the pivot axis 100. Specifically, reference surfaces 110, 120 are oriented and calibrated relative to the mounted position and orientation of the vial 50, such that when the surface 110 and/or 120 is engaged with a horizontal, level surface being measured, the bubble within vial 50 will be positioned in the vial to indicate the level orientation of the measured surface. As best shown in FIG. 2, when the arms 20, 30 are in their open position, their bottom surfaces 21, 31 together define an additional reference surface or plane 130, while their top surfaces 23, 33 together define an additional reference surface or plane 140. The reference surfaces 130, 140 are preferably perpendicular to the pivot axis 100. The reference surfaces 21, 23, 31, 33 are oriented and calibrated relative to the mounted position and orientation of the vial 50 such that when one of the surfaces 130, 140 are engaged with a vertical, plumb surface being measured, the bubble within vial 50 will be positioned to indicate the plumb orientation of the surface being measured.

Figure 7:
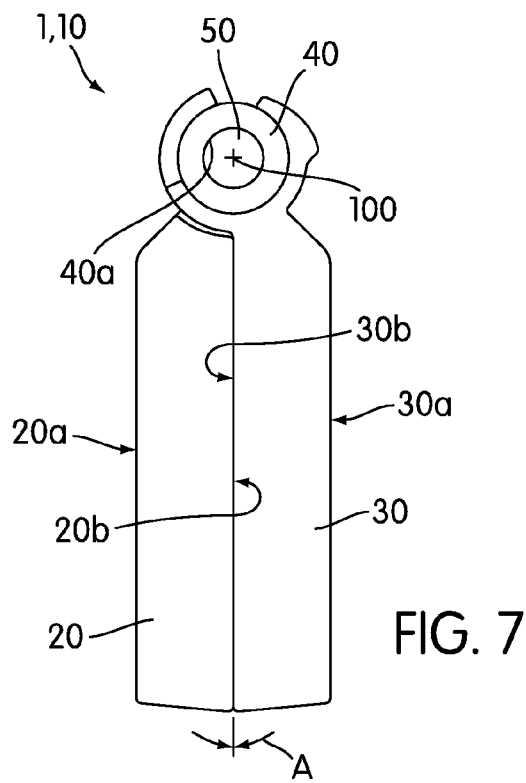
FIG. 7 is a top view of the level of FIG. 1 in a closed position.
Figure 8:
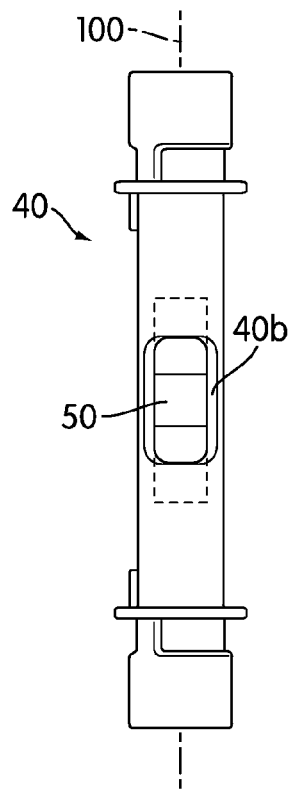
FIG. 8 is a front view of a pivot body of the level of FIG. 1.

As shown in FIGS. 6 and 7, when the arms 20, 30 are open, the inner sides 20b, 30b of the arms 20, 30 form an angle A relative to each other about pivot axis 100 (e.g., the pivot axis 100 creates the vertex of the angle A). The angle A is 0 degrees when the arms 20, 30 are in their closed position (see FIG. 7) (although this angle can differ as it is no consequence) and is larger than 180 degrees when the arms 20, 30 are in their open position (see FIG. 6). The points on the arms that define the angle A are arbitrary (e.g., any points on the arms 20, 30 that touch each other when the arms 20, 30 are in their closed position). As shown in FIG. 6, when the arms 20, 30 are in their open position, in different embodiments, the angle A may range between 180 and 360 degrees, may be between 200 and 340 degrees, may be between 220 and 320 degrees, may be between 240 and 300 degrees, and may be about 270 degrees.

Figure 1:
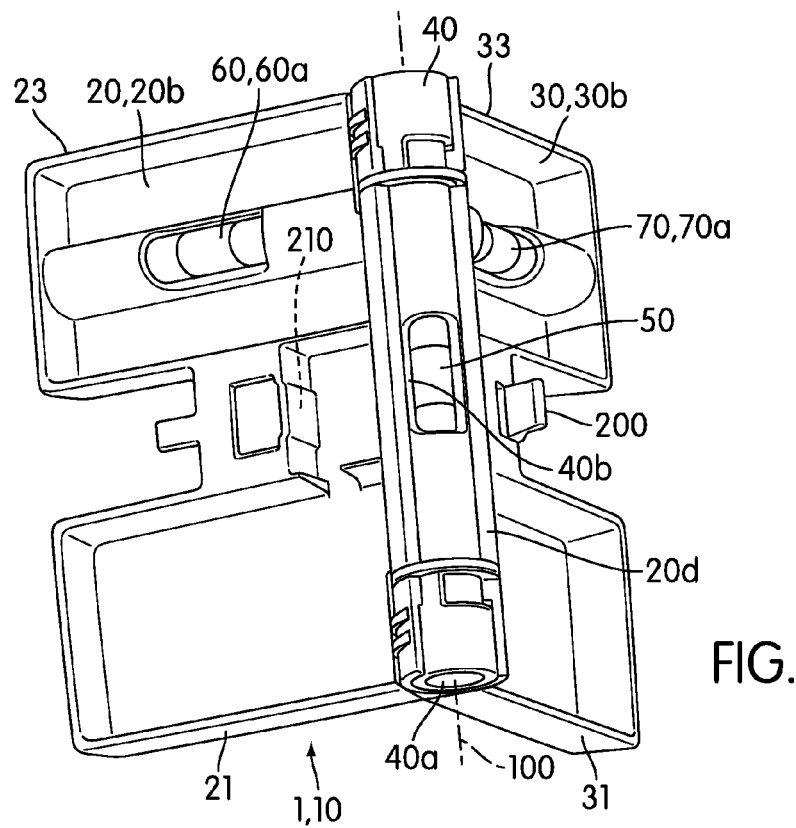
FIG. 1 is a front perspective view of a level in an open position according to an embodiment of the present invention.

As shown in FIGS. 1 and 2, when the arms 20, 30 are in their open position, the lateral opening 40b and measurement portion 50a of the bubble vial 50 are exposed on a side of the level 1 that defines the angle A. When the arms 20, 30 are in their open position, the lateral opening 40b and measurement portion 50a are exposed on a same side of the level 1 as the inner sides 20b, 30b of the arms 20, 30, and on an opposite side of the level 1 as the outer sides 20a, 30a. As seen in FIG. 1, when the arms 20, 30 are in their open position, the lateral opening 40b and the measurement portion 50a are exposed on a side of the level 1 in which an angle between the arms 20, 30 is larger than 180 degrees.

As shown in FIGS. 1 and 2, the bubble vials 60, 70 are mounted to the arms 20, 30, respectively such that their measurement portions 60a, 70a are viewable from the inner sides 20b, 30b of the arms 20, 30. In one embodiment, longitudinal axes of the bubble vials 60, 70 are generally perpendicular to the pivot axis 100, and are generally parallel to the reference planes 110, 120, respectively. The measurement portions 60a, 70a are exposed and viewable when the arms 20, are in their open position (see FIGS. 1-2), and are shielded within the body 10 when the arms are in their closed position (see FIGS. 4-5). The longitudinal axes of the bubble vials 60, 70 are disposed at the angle A relative to each other when the arms are in their open position. Alternatively, the bubble vials 60, 70 may have any other useful orientation and position on the level 1, and either or both bubble vials 60, 70 may be omitted without deviating from the scope of the present invention.

Figure 3:
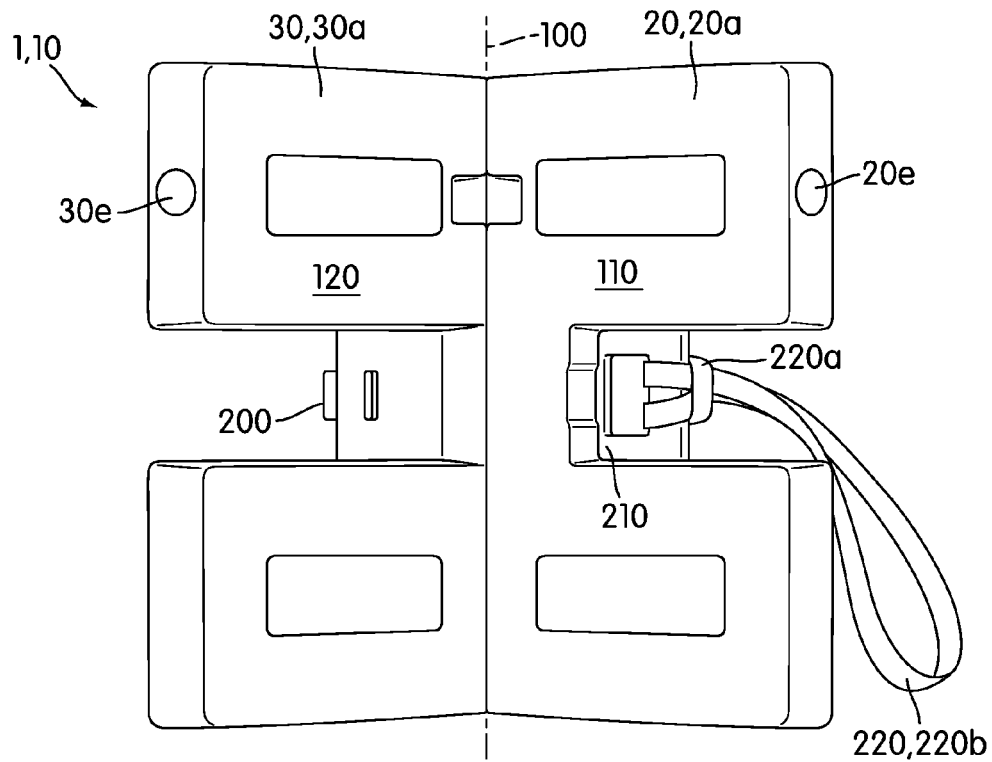
FIG. 3 is a rear view of the level of FIG. 1 in an open position.
Figure 4:
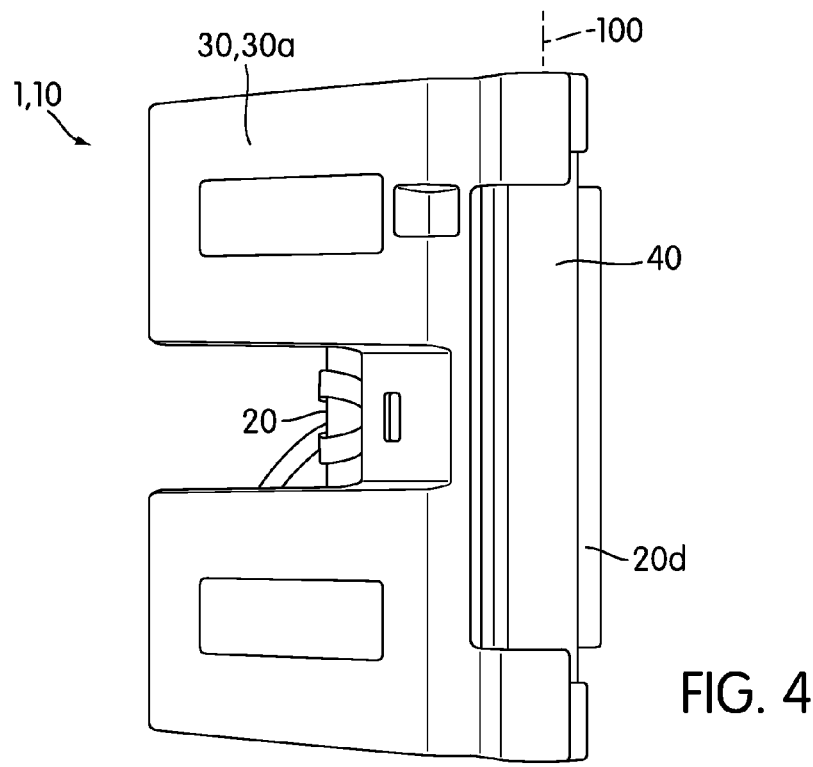
FIG. 4 is a perspective rear side view of the level of FIG. 1 in a closed position.
Figure 5:
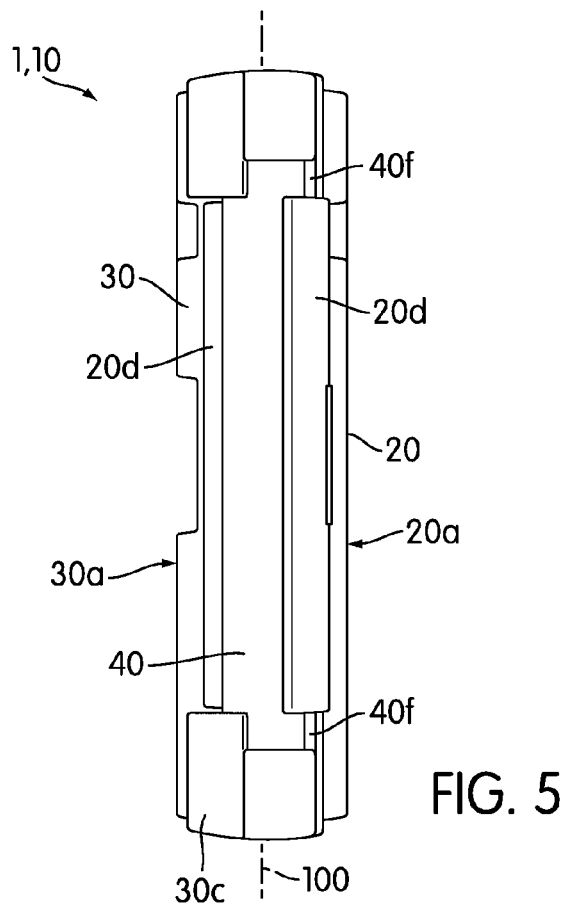
FIG. 5 is a rear view of the level of FIG. 1 in a closed position.

As shown in FIG. 3, the bubble vials 60, 70 are attached to the arms 20, 30, respectively, via insertion into holes 20e, 30e in the arms 20, 30. Alternatively, the bubble vials 50, 60, 70 may be attached to the pivot body 40, and arms 20, 30, respectively, in any other suitable manner, as would be understood by one of ordinary skill in the art.

As shown in FIG. 6, the arm 30 includes an integrally molded tab that forms a latch 200 that extends from the inner side 30b. As shown in FIG. 3, the arm 20 includes a corresponding recess 210. The latch 200 aligns with and engages a side surface adjacent (or partially defining) the recess 210 when the arms 20, 30 move into their closed position. When in the closed position, the latch 200 is resiliently biased against the side surface adjacent the recess 210 to urge the arms 20, 30 to remain in their closed position. To move the arms 20, 30 from their closed position to their open position, the user pulls the arms 20, 30 apart against the biasing force of the resilient engagement of the latch 200 to the side surface of the recess 210. Alternatively, the latch 200 may comprise a positive locking latch that must be positively released (e.g., by pulling the latch 200 or a latch handle/release thereof away from the recess 210), or any other suitable latch arrangement.

As shown in FIG. 3, a flexible tether 220 includes a first end 220a that attaches to the arm 20, and a second end 220b is constructed and shaped to releasably be attached to the latch 200 when the arms 20, 30 are in their open position. In the illustrated embodiment, the flexible tether 220 comprises an elastic band and the second end 220b comprises a loop in the elastic band. The loop 220b can be wrapped around the latch 200 to secure the second end 220b to the latch 200.

Hereinafter, operation of the level 1 is described. When the arms 20, 30 are closed, the bubble vials 50, 60, 70 are enclosed and shielded within the body 10 of the level 1 so as to inhibit other objects from breaking the bubble vials 50, 60, 70. To use the level 1, the user moves the arms 20, 30 into their open position, which exposes for use the measurement portions 50a, 60a, 70a of the bubble vials 50, 60, 70. While operation of vial 50 has been previously described, it can be appreciated that vials 60, 70 provide a plumb indication when surfaces 110 and 120 engage to different surfaces of an object to be measured. If the surfaces 110, 120, for example, engage orthogonal surfaces of an upright 4"×4" post, the vials 60, 70 can be used to provide a plumb indication in two different planes (front, and back, as well as side-to-side).

If convenient, the user may wrap the tether 220 around the object and attach the second end 220b of the tether 220 to the latch 200 to secure the level 1 to the object. The user then views the measurement portion(s) 50a, 60a, 70a of one or more of the bubble vials 50, 60, 70 to ascertain an orientation of the object (e.g., how qualitatively close the object is to vertical or horizontal). After use, the user disengages the tether 220 from the latch 200 if needed. The user then moves the arms 20, 30 back to their closed position, which makes the level 1 more compact for storage, and protects the bubble vials 50, 60, 70 within the body 10.

Longitudinal ends of the bubble vials 50, 60, 70 may be accessible via the holes 40a, 20e, 30e, respectively, even when the arms 20, 30 are in their closed position. However, the bubble vials 50, 60, 70, and in particular their typically more fragile measurement portions 50a, 60a, 70a, remain shielded and enclosed within the body 10 despite such holes 40a, 20e, 30e. The depth and size of the holes 40a, 20e, 30e may reduce the likelihood that a foreign object would extend into one of the holes 40a, 20e, 30e and break one of the bubble vials 50, 60, 70. Moreover, the longitudinal ends of the bubble vials 50, 60, 70 are typically more robust than the measurement portions 50a, 60a, 70a thereof, and can better resist damage. Caps/plugs may cover the holes 40a, 20e, 30e to further safeguard the bubble vials 50, 60, 70.

In an alternative embodiment, the vial 50 may take the form of a bull's-eye bubble vial. In yet another embodiment, vial 50 may be oriented to have a longitudinal axis that is perpendicular to the longitudinal axis 100 to provide a plumb indication for vertical structures such as posts.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A level comprising:
    a body including first and second arms connected for relative pivotal movement about a pivot axis between open and closed positions, the body including at least one reference surface; and
    a first bubble vial mounted to the body and having a longitudinal axis disposed parallel to or coaxial with the pivot axis, the first bubble vial being constructed and arranged to provide an indication of an orientation of the at least one reference surface,
    wherein movement of the arms from their closed position to their open position exposes a measurement portion of the first bubble vial for use, and
    wherein movement of the arms from their open position to their closed position shields the measurement portion of the first bubble vial within the body.

2. The level of claim 1, wherein the at least one reference surface comprises first and second reference surfaces defined by the first and second arms, respectively, and wherein the first and second reference surfaces are parallel to or include the pivot axis.

3. The level of claim 2, wherein, when in the open position, the arms together define a third reference surface that is perpendicular to the pivot axis.

4. The level of claim 1, further comprising a second bubble vial attached to the first arm, the second bubble vial having a longitudinal axis that is perpendicular to the pivot axis,
    wherein movement of the arms from their closed position to their open position exposes a measurement portion of the second bubble vial for use, and
    wherein movement of the arms from their open position to their closed position shields the measurement portion of the second bubble vial within the body.

5. The level of claim 4, further comprising a third bubble vial attached to the second arm, the third bubble vial having a longitudinal axis that is perpendicular to the pivot axis,
    wherein movement of the arms from their closed position to their open position exposes a measurement portion of the third bubble vial for use,
    wherein movement of the arms from their open position to their closed position shields the measurement portion of the third bubble vial within the body, and
    wherein the longitudinal axes of the second and third bubble vials are disposed at an angle relative to each other of between 60 and 120 degrees when the arms are in their open position.

6. The level of claim 4, wherein:
    the at least one reference surface comprises first and second reference surfaces defined by the first and second arms, respectively,
    the first and second reference surfaces are parallel to or include the pivot axis,
    the second bubble vial is attached to the second arm, and
    the longitudinal axis of the second bubble vial is parallel to or included within the second reference surface.

7. The level of claim 1, wherein the longitudinal axis of the first bubble vial is coaxial with the pivot axis.

8. The level of claim 1, wherein the first bubble vial is pivotally movable about the pivot axis relative to both arms.

9. The level of claim 1, wherein movement of the arms from their open position to their closed position causes the first bubble vial to pivotally move about the pivot axis relative to both arms.

10. The level of claim 1, wherein:
    the arms have inner sides that face toward each other when the arms are in their closed position; and when the arms are in their open position, the measurement portion of the first bubble vial is exposed on a side of the level that includes the inner sides.

11. The level of claim 1, wherein:
the arms form an angle relative to each other about the pivot axis when in their open position, and
when the arms are in their open position, the measurement portion of the first bubble vial is exposed on a side of the arms in which the angle is larger than 180 degrees.

12. The level of claim 1, wherein:
the body further comprises a pivot body that pivotally connects to each of the arms for pivotal movement relative to each of the arms about the pivot axis, and
the first bubble vial is mounted to the pivot body for pivotal movement with the pivot body relative to each of the arms about the pivot axis.

13. The level of claim 12, wherein:
the first bubble vial is disposed within the pivot body, and
the pivot body includes a lateral opening through which the measurement portion of the bubble vial is viewable.

14. The level of claim 13, wherein one of the arms comprises a cover portion that covers the lateral opening when the arms are in their closed position.

15. The level of claim 13, wherein the pivot body and first arm each have pivot stops that limit and define a first pivotal range between the pivot body and the first arm, one end of the first pivotal range corresponding to an angle between the pivot body and the first arm when the arms are in their closed position, another end of the first pivotal range corresponding to an angle between the pivot body and the first arm when the arms are in their open position.

16. The level of claim 15, wherein the pivot body and second arm each have pivot stops that limit and define a second pivotal range between the pivot body and the second arm, one end of the second pivotal range corresponding to an angle between the pivot body and the second arm when the arms are in their closed position, another end of the second pivotal range corresponding to an angle between the pivot body and the second arm when the arms are in their open position.

17. The level of claim 1, wherein:
the second arm includes a recess; and
the first arm includes a latch that aligns with the recess when the arms are in their closed position, and is resiliently biased toward the recess to urge the arms to remain in their closed position when the arms are in their closed position.

18. The level of claim 17, further comprising a flexible tether, a first end of which is attached to the second arm, a second end of which is constructed and shaped to releasably attach to the latch when the arms are in their open position.

19. A level comprising:
a body including first and second arms connected for relative pivotal movement about a pivot axis between open and closed positions; and
a first bubble vial mounted to the body and having a longitudinal axis parallel to or coaxial with the pivot axis,
wherein movement of the arms from their open position to their closed position causes the first bubble vial to pivotally move about the pivot axis relative to both arms.

20. A method of using a level, comprising moving first and second arms of a level relative to each other about a pivot axis from a closed position to an open position, wherein said moving exposes for use a measurement portion of a first bubble vial, the first bubble vial having a longitudinal axis that is parallel to or coaxial with the pivot axis.

21. The method of claim 20, further comprising moving the arms from their open position to their closed position, wherein said moving of said arms from their open position to their closed position shields the measurement portion of the first bubble vial within a body of the level.

22. The method of claim 20, wherein:
said moving comprises moving the arms relative to each other against a biasing force of a latch on the first arm that resiliently engages a recess in the second arm when the arms are in their closed position, and
the method further comprises:
positioning the level against an object, and
attaching the level to the object by attaching an end of a tether to the latch, an opposite end of the tether being attached to the second arm.

* * * * *